United States Patent
Kurihara

(10) Patent No.: US 7,266,062 B2
(45) Date of Patent: Sep. 4, 2007

(54) NOISE REMOVAL USING 180-DEGREE OR 360-DEGREE PHASE SHIFTING CIRCUIT

(75) Inventor: Shinji Kurihara, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 403 days.

(21) Appl. No.: 10/724,873

(22) Filed: Dec. 2, 2003

(65) Prior Publication Data

US 2004/0136289 A1 Jul. 15, 2004

(30) Foreign Application Priority Data

Dec. 2, 2002 (JP) ............... 2002-349363

(51) Int. Cl.
*G11B 7/00* (2006.01)
*H03K 19/094* (2006.01)
*H04B 1/10* (2006.01)

(52) U.S. Cl. ............... 369/47.44; 369/47.48; 326/26; 327/551

(58) Field of Classification Search ............ 369/47.44, 369/47.48, 53.33; 327/34, 551, 552; 708/300; 326/26, 27; G11B 7/00; G06F 17/10; H03K 9/08, H03K 5/00, 19/094; H04B 1/10
See application file for complete search history.

(56) References Cited

U.S. PATENT DOCUMENTS

| | | | | | |
|---|---|---|---|---|---|
| 5,394,115 | A | * | 2/1995 | Lampel | ............ 331/4 |
| 6,081,490 | A | * | 6/2000 | Kuroda et al. | ............ 369/47.28 |
| 6,104,682 | A | * | 8/2000 | Konishi | ............ 369/44.34 |
| 6,369,624 | B1 | * | 4/2002 | Wang et al. | ............ 327/156 |

FOREIGN PATENT DOCUMENTS

JP     2000-293855     10/2000

* cited by examiner

*Primary Examiner*—A M Psitos
(74) *Attorney, Agent, or Firm*—Fish & Richardson P.C.

(57) ABSTRACT

A noise removal circuit of the present invention comprises a 180-degree odd multiple shifting section for outputting a 180-degree shifted signal that is phase-shifted from an input signal by an odd multiple of 180 degrees and difference output section for outputting a difference between the input signal and the 180-degree shifted signal. The noise removal circuit comprises a 360-degree shifting section for outputting a 360-degree shifted signal that is phase-shifted from an input signal by an integral multiple of 360 degrees and sum output section for outputting a sum of the input signal and the 360-degree shifted signal.

27 Claims, 5 Drawing Sheets

NOISE REMOVAL USING 180-DEGREE OR 360-DEGREE PHASE SHIFTING CIRCUIT

CROSS-REFERENCE TO RELATED APPLICATIONS

The present application claims priority upon Japanese Patent Application No. 2002-349363 filed on Dec. 2, 2002, which is herein incorporated by reference.

BACKGROUND OF THE INVENTION

1. Field of the Invention

The present invention relates to a noise removal circuit and a noise removal method.

2. Description of the Related Art

Prior art related to signal noise removal are covered in signal recording and reproduction devices such as a hard disk and an optical disk. For instance, optical disks that allow data recording using laser beam are classified into write-once optical disks such as CD-R, DVD-R and DVD+R and rewritable optical disks such as CD-RW, MD, DVD-RAM, DVD-RW, DVD+RW and MO.

A recording and reproduction device for such optical disks (hereinafter written as an "optical disk device") comprises, as an example, an optical pickup, a WBL (wobble signal) detection unit, an LPP detection unit, a write clock generation unit, a decoder, a spindle motor, a spindle servo circuit, an optical pickup servo circuit, a processor, an interface unit, an encoder, a laser control unit and a ROM.

Of all the components, the aforementioned WBL signal extraction circuit is shown in FIG. 11. An optical pickup 11 irradiates an optical beam onto the recording track of an optical disk 1 based on a laser control signal. A WBL detection unit 12 comprises a wobble (WBL) signal B.P.F. (Band Pass Filter) circuit 12a, a comparator 12b and so on. A radial push-pull signal SDT, detected based on a reflected light of an optical beam B, is input to the wobble signal B.P.F. circuit 12a. The wobble signal B.P.F. circuit 12a removes a high-frequency noise component and extracts a WBL signal component A_WBL from the radial push-pull signal SDT (See, e.g., Japanese Patent Application Laid-open Publication No. 2000-293855).

A binary-valued WBL signal is output by comparing the WBL signal component A_WBL (negative side) and a reference voltage (positive side) using the comparator 12b. The binary-valued WBL signal is output to the write clock generation unit, the spindle servo circuit 17 and so on.

In extracting the WBL signal component A_WBL, the wobble signal B.P.F. circuit 12a removes the high-frequency noise component from the radial push-pull signal SDT. Nevertheless, some noise component has remained in the WBL signal component A_WBL after passage through the wobble signal B.P.F. circuit 12a.

Jitter occurs in the clock during optical disk recording or reproduction in the event of an increase in this noise component. Occurrence of the jitter has hindered synchronization of the optical disk rotation speed and the clock, resulting in recording or reproduction failure and other problems.

The wobble signal may become amplitude-modulated depending on the disk or pickup condition, occasionally resulting in the wobble signal being impossible to read correctly.

Further, the wobble signal may be lost as a result of disk damage or other cause, occasionally adversely affecting the control system using the wobble signal.

Still further, an AC signal may be superposed onto the wobble signal at disk rotation cycles due to effects such as unevenness or double refraction in disk protective film and pickup condition, occasionally resulting in the wobble signal being difficult to read correctly.

SUMMARY OF THE INVENTION

It is therefore an object of the present invention to provide a noise removal circuit and method capable of overcoming the above deficiencies.

In order to achieve the above and other objects, according to a first aspect of the present invention there is provided a noise removal circuit comprising a 180-degree odd multiple shifting section for outputting a 180-degree shifted signal that is phase-shifted from an input signal by an odd multiple of 180 degrees and difference output section for outputting a difference between the input signal and the 180-degree shifted signal.

According to a second aspect of the present invention there is provided a noise removal circuit comprising a 360-degree shifting section for outputting a 360-degree shifted signal that is phase-shifted from an input signal by an integral multiple of 360 degrees and a sum output section for outputting a sum of the input signal and the 360-degree shifted signal.

According to a third aspect of the present invention there is provided a noise removal circuit comprising a 180-degree odd multiple shifting section for outputting a 180-degree shifted signal that is phase-shifted from an input signal by an odd multiple of 180 degrees, a 360-degree shifting section for outputting a 360-degree shifted signal that is phase-shifted from an input signal by an integral multiple of 360 degrees and calculation output section for outputting calculation results of a difference between the input signal and the 180-degree shifted signal and a sum of the input signal and the 360-degree shifted signal.

According to a fourth aspect of the present invention there is provided a noise removal method comprising outputting a 180-degree shifted signal that is phase-shifted from an input signal by an odd multiple of 180 degrees and outputting a difference between the input signal and the 180-degree shifted signal.

According to a fifth aspect of the present invention there is provided a noise removal method comprising outputting a 360-degree shifted signal that is phase-shifted from an input signal by an integral multiple of 360 degrees and outputting a sum of the input signal and the 360-degree shifted signal.

According to a sixth aspect of the present invention there is provided a noise removal method comprising outputting a 180-degree shifted signal that is phase-shifted from an input signal by an odd multiple of 180 degrees, outputting a 360-degree shifted signal that is phase-shifted from the input signal by an integral multiple of 360 degrees and outputting calculation results of a difference between the input signal and the 180-degree shifted signal and a sum of the input signal and the 360-degree shifted signal.

BRIEF DESCRIPTION OF THE DRAWINGS

The above and other objects, aspects, features and advantages of the present invention will become mote apparent from the following detailed description when taken in conjunction with the accompanying drawings, in which.

DETAILED DESCRIPTION OF THE INVENTION

Figure 1:
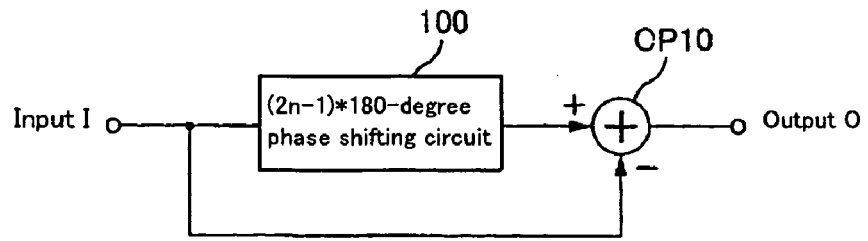
FIG. 1 is a block diagram showing the principle of noise removal according to a first embodiment of the present invention.

At least the following items will become apparent from descriptions of this specification and of the accompanying drawings.

A first aspect of the present invention there is provided a noise removal circuit comprising a 180-degree odd multiple shifting section for outputting a 180-degree shifted signal that is phase-shifted from an input signal by an odd multiple of 180 degrees and difference output section for outputting a difference between the input signal and the 180-degree shifted signal. This ensures effective reduction of noise component in the input signal.

According to a second aspect of the present invention there is provided a noise removal circuit comprising a 360-degree shifting section for outputting a 360-degree shifted signal that is phase-shifted from an input signal by an integral multiple of 360 degrees and a sum output section for outputting a sum of the input signal and the 360-degree shifted signal.

This ensures effective reduction of noise component in the input signal.

According to a third aspect of the present invention there is provided a noise removal circuit comprising a 180-degree odd multiple shifting section for outputting a 180-degree shifted signal that is phase-shifted from an input signal by an odd multiple of 180 degrees, a 360-degree shifting section for outputting a 360-degree shifted signal that is phase-shifted from an input signal by an integral multiple of 360 degrees and calculation output section for outputting calculation results of a difference between the input signal and the 180-degree shifted signal and a sum of the input signal and the 360-degree shifted signal. This provides more efficient noise removal effects by calculating the results of the difference between the input signal and the 180-degree shifted signal and the sum of the input signal and the 360-degree shifted signal.

The noise removal circuit may further comprise a synchronizing signal output section for outputting a synchronizing signal for synchronizing the input signal and the 180-degree shifted signal, in which the difference output section output the difference in response to the synchronizing signal. This ensures synchronization between the input signal and the 180-degree shifted signal using the synchronizing signal output section, thus allowing more precise phase shifting operation.

The noise removal circuit may further comprise a synchronizing signal output section for outputting a synchronizing signal for synchronizing the input signal and the 360-degree shifted signal, in which the sum output section output the sum in response to the synchronizing signal. This ensures synchronization between the input signal and the 360-degree shifted signal using the synchronizing signal output section, thus allowing more precise phase shifting operation.

The synchronizing signal output section may be constituted by a phase-locked loop circuit and generate the synchronizing signal based on the input signal. This ensures synchronization between the input signal and the shifted signal using the phase-locked loop circuit, thus allowing more precise phase shifting operation.

The synchronizing signal output section may be constituted by a delay-locked loop circuit and generate the synchronizing signal based on the input signal. This ensures synchronization between the input signal and the shifted signal using the delay-locked loop circuit, thus allowing more precise phase shifting operation. This also ensures faster phase adjustment as compared with the phase-locked loop circuit that pulls in frequency.

The input signal may be a wobble signal for rotation control detected from optical disk's recording track. This reduces noise component in the wobble signal, preventing occurrence of jitter during optical disk recording and reproduction. As a result, problems derived from noise in the wobble signal can be resolved such as failure to achieve synchronization between optical disk rotation speed and clock, thus allowing proper recording and reproduction.

In order to attain the above and other objects, according to a fourth aspect of the present invention there is provided a noise removal method comprising outputting a 180-degree shifted signal that is phase-shifted from an input signal by an odd multiple of 180 degrees and outputting a difference between the input signal and the 180-degree shifted signal. This ensures effective reduction of noise component in the input signal.

According to a fifth aspect of the present invention there is provided a noise removal method comprising outputting a 360-degree shifted signal that is phase-shifted from an input signal by an integral multiple of 360 degrees and outputting a sum of the input signal and the 360-degree shifted signal. This ensures effective reduction of noise component in the input signal.

According to a sixth aspect of the present invention there is provided a noise removal method comprising outputting a 180-degree shifted signal that is phase-shifted from an input signal by an odd multiple of 180 degrees, outputting a 360-degree shifted signal that is phase-shifted from the input signal by an integral multiple of 360 degrees and outputting calculation results of a difference between the input signal and the 180-degree shifted signal and a sum of the input signal and the 360-degree shifted signal. This provides more efficient noise removal effects by calculating the results of the difference between the input signal and the 180-degree shifted signal and the sum of the input signal and the 360-degree shifted signal.

The input signal may be a wobble signal for rotation control detected from optical disk's recording track. This reduces noise component in the wobble signal, preventing occurrence of jitter during optical disk recording and reproduction. As a result, problems derived from noise in the wobble signal can be resolved such as failure to achieve synchronization between optical disk rotation speed and clock, thus allowing proper recording and reproduction.

FIRST EMBODIMENT

A first embodiment will now be described with reference to FIGS. 1 to 7. First, a $(2n-1)*180$-degree phase shifting circuit (180-degree odd multiple shifting section) 100 generates a signal phase-shifted by $(2n-1)*180$ degrees from a signal component of an input signal I (hereinafter referred to as "180-degree shifted signal") and outputs the signal to the non-inverted input terminal (+) of an operational amplifier OP10, as shown in the block diagram of FIG. 1 showing the principle of noise removal. It should be noted that "n" is an integer. It should be also noted that the input signal I is input to the inverted input terminal (−) of the operational amplifier (difference output section) OP10.

Therefore, an output O of the operational amplifier OP10 is a difference between the input signal I and the 180-degree shifted signal. The noise removal circuit for the input signal I is thus configured.

The principle of noise removal from the input signal I will be described using mathematical formulas.

If we let a pure wobble signal be $WO=A*\sin(\omega t)$ and a noise component be $N(t)$, then an input signal $I(t)$ can be expressed by $I(t)=A*\sin(\omega t)+N(t)$. In the principle of noise removal of this embodiment, a difference is taken between the input signal $I(t)$ and a signal phase-shifted from the input signal by $(2n-1)*180$ degrees (n is an integer).

That is, the signal phase-shifted by $(2n-1)*180$ degrees (n is an integer) from the input signal component or $I(t-(2n-1)*\pi)$ is expressed by $A*\sin(\omega t-(2n-1)*\pi)+N(t)$. Therefore, taking the difference between the input signal $I(t)$ and the signal phase-shifted by $(2n-1)*180$ degrees from the signal component of the input signal, the resultant signal can be expressed by $I(t)-I(t-(2n-1)*\pi)=A*(\sin(\omega t)-\sin(\omega t-(2n-1)*\pi))+\sqrt{(2*N(t)'2)}=2*A*\sin(\omega t)+\sqrt{2}*N(t).$ That is, although the S/N ratio of the input signal (t) is originally $A/N(t)$, the S/N ratio after noise removal is $\sqrt{2}*A/N(t)$, providing a $\sqrt{2}$ fold improvement in S/N ratio.

Figure 2:
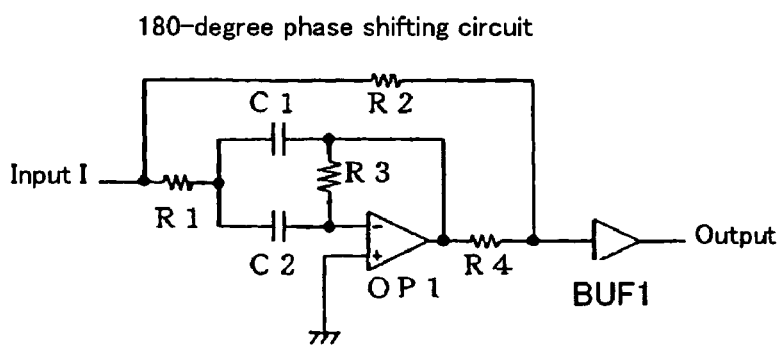
FIG. 2 is a specific circuit diagram of a phase shifting circuit shown in FIG. 1 according to the first embodiment of the present invention.

Specific circuits implementing the noise removal operation expressed by these mathematical formulas will be described with reference to FIGS. 2 to 7. FIG. 2 shows a specific circuit configuration of the phase shifting circuit shown in FIG. 1. The input signal I(t) is input to the inverted input terminal (−) of an operational amplifier OP1 via a resistor R1, capacitors C1 and C2 and a resistor R3. The non-inverted input terminal (+) of the operational amplifier OP1 is grounded. The output of the operational amplifier OP1 is fed back to the inverted input terminal (−) of the operational amplifier OP1 via the capacitors C1 and C2 and the resistor R3. Additionally, the output of a resistor R4 connected to the output terminal of the operational amplifier OP1 is fed back to the terminal on the signal input side of the resistor R1 via the resistor R2.

The output of the operational amplifier OP1 is output via the resistor R4 and a buffer BUF1. The output signal of the buffer BUF1 is a signal phase-shifted by $(2n-1)*180$ degrees from the signal component of the input signal input to the resistor R1.

FIRST VARIANT OF FIRST EMBODIMENT

The first variant of the first embodiment shown in FIG. 1 will be described with reference to FIG. 3. In this variant, a DLL (delay-locked loop)-based phase-adjusting circuit is employed as the noise removal circuit shown in FIG. 1 to achieve synchronization with the input signal I. That is, a frequency-controlled circuit is used as the phase shifting circuit, and the output of the phase shifting circuit is inverted by an inverter and input to one of the input terminals (an input 2) of a phase comparator (synchronizing signal output section). The input signal I is input to the other input terminal (an input 1) of the phase comparator. The output of the phase comparator is input to the frequency-controlled phase shifting circuit as a frequency control signal that serves as a synchronizing signal. It should be noted that high-frequency noise in the phase comparator output is removed by a capacitor C0.

The phase comparator can synchronize the input signal and the 180-degree shifted signal, thus allowing more precise phase shifting operation.

Use of a DLL-based phase-adjusting circuit ensures faster phase adjustment as compared with the PLL discussed later that pulls in frequency.

Figure 3:
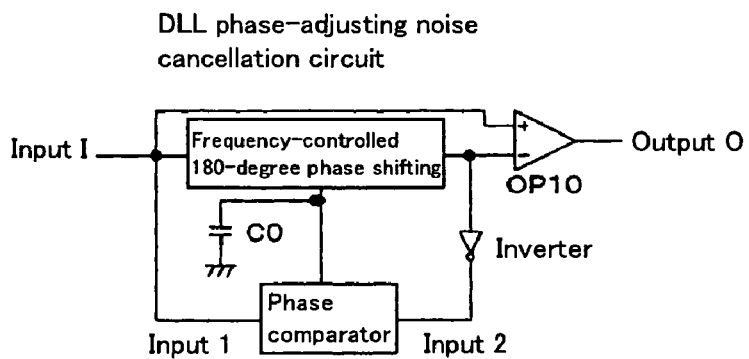
FIG. 3 is a circuit diagram of a noise removal circuit according to the first variant of the first embodiment of the present invention.
Figure 4:
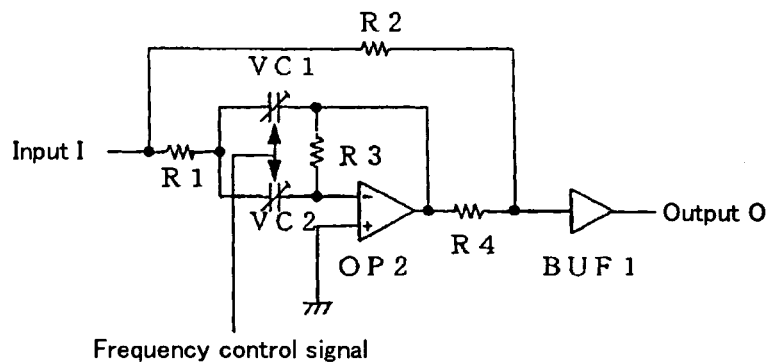
FIG. 4 is a specific circuit diagram of a frequency-controlled phase shifting circuit shown in FIG. 3 according to the first variant of the first embodiment of the present invention.

FIG. 4 shows a specific circuit configuration of the frequency-controlled phase shifting circuit shown in FIG. 3. The capacitors C1 and C2 in the phase shifting circuit of FIG. 2 discussed earlier are replaced by variable capacitors VC1 and VC2, with the capacitances of the variable capacitors VC1 and VC2 changed by a frequency control signal. Variation of the capacitances produces a signal phase-shifted from the input signal by $(2n-1)*180$ degrees.

Figure 5:
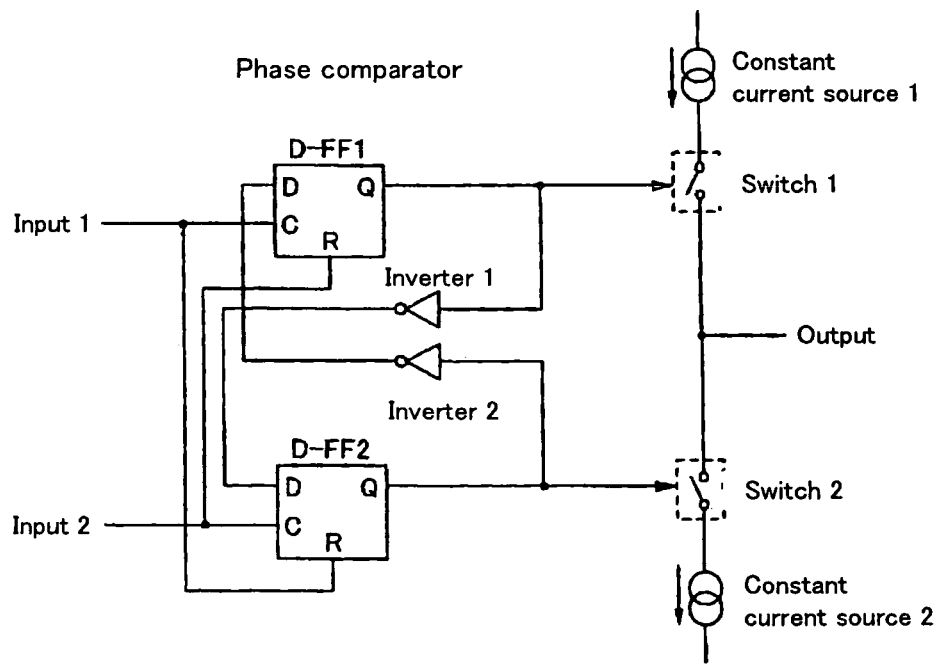
FIG. 5 is a specific circuit diagram of a phase comparator shown in FIG. 3 according to the first variant of the first embodiment of the present invention.

Next, FIG. 5 shows a specific circuit configuration of the phase comparator shown in FIG. 3. The phase comparator is configured by combining two groups of circuits, each made up of a D-type flip-flop (abbreviated as "D-FF"), an inverter and a constant current source. More specifically, the phase comparator outputs the frequency control signal in response to two inputs 1 and 2. The input 1 is input to a clock terminal C of a D-FF 1 and a reset terminal R of a D-FF 2. An output Q of the D-FF 1 is supplied to a switch 1 as an on-off signal and to a data terminal D of the D-FF 2 via an inverter 1. The other input 2 is input to a clock terminal C of the D-FF 2 and a reset terminal R of the D-FF 1. An output Q of the D-FF 2 is supplied to a switch 2 as an on-off signal and to a data terminal D of the D-FF 1 via an inverter 2.

The phase comparator thus configured complementarily turns switches SW1 and SW2 on or off. This allows the outputs Q of the D-FF 1 and the D-FF 2 to be alternately output to the shifting circuit as a frequency control signal.

SECOND VARIANT OF FIRST EMBODIMENT

The second variant of the first embodiment shown in FIG. 1 will be described with reference to FIG. 6. In the second variant, a PLL (phase-locked loop)-based phase-adjusting circuit is employed as the noise removal circuit shown in FIG. 1 to achieve synchronization with the input signal I. That is, a VCO circuit (synchronizing signal output section) is added to the first variant of FIG. 3 discussed earlier. The second variant will be described, focusing on the differences from the first variant shown in FIG. 3. The output of the phase comparator (synchronizing signal output section) shown in FIG. 5 is input to the frequency-controlled phase shifting circuit shown in FIG. 4 and to the VCO circuit as a frequency control signal that serves as a synchronizing signal. The output of the VCO circuit is fed back and input to the phase comparator (input 2). It should be noted that high-frequency noise in the phase comparator output is removed by the capacitor C0.

The PLL circuit including the phase comparator ensures synchronization between the input signal and the 180-degree shifted signal, thus allowing more precise phase shifting operation.

In the noise removal circuit of this embodiment, if the frequency-controlled phase shifting circuit and the VCO circuit are packed on the same chip, there is a correlation in center frequency between the two circuits, thus allowing more precise phase control.

Figure 6:
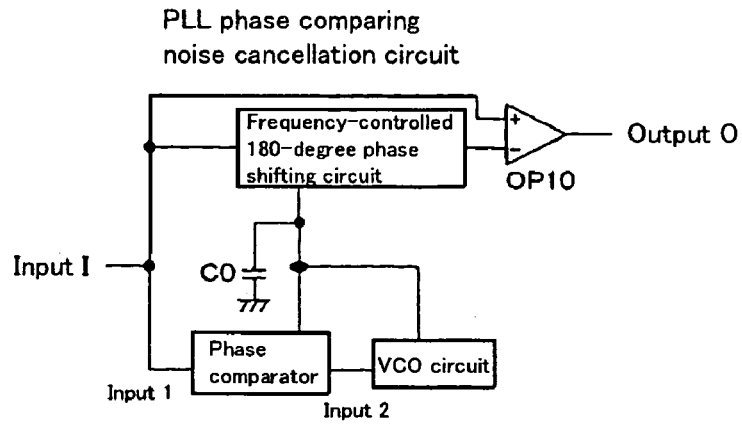
FIG. 6 is a circuit diagram of a noise removal circuit according to the second variant of the present invention.
Figure 7:
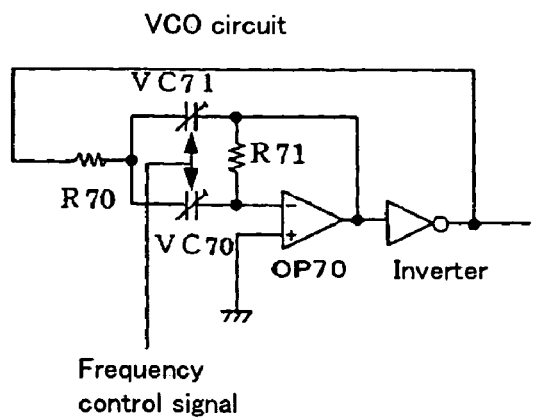
FIG. 7 is a circuit diagram of a VCO circuit according to an embodiment of the present invention.

FIG. 7 shows a specific circuit configuration of the VCO circuit. The output of an operational amplifier OP70 is inverted by an inverter. The inverted output of the inverter is input to the phase comparator shown in FIG. 6 as the output of the VCO circuit. The inverted output of the inverter is fed back to the inverted input terminal (−) of the operational amplifier OP70 via a resistor R70, variable capacitors VC71 and VC71 and a resistor R71. Additionally, the output of the operational amplifier OP70 is fed back to the inverted input terminal (−) of the operational amplifier OP70 via the variable capacitors VC70 and VC71 and the resistor R71. The non-inverted input terminal (+) of the operational amplifier OP70 is grounded.

The capacitances of the variable capacitors VC70 and VC71 are changed by a frequency control signal. Variation of the capacitances changes the VCO circuit output.

SECOND EMBODIMENT

Figure 8:
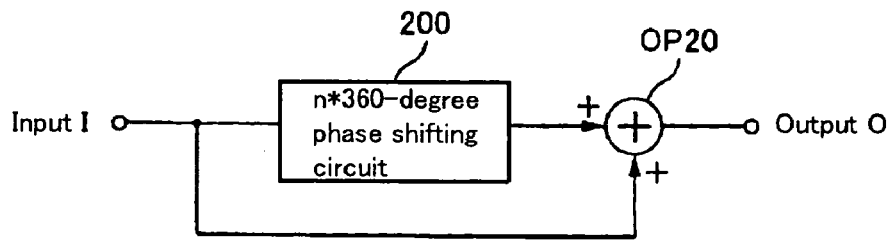
FIG. 8 is a block diagram showing the principle of noise removal according to a second embodiment of the present invention.

The second embodiment will be described with reference to FIGS. 8 and 9. First, a signal phase-shifted from the signal component of the input signal I by n*360 degrees (hereinafter referred to as a "360-degree shifted signal") is generated by a n*360-degree phase shifting circuit (360-degree shifting section) 200 and output to one of the non-inverted input terminals (+) of an operational amplifier (sum output section) OP20, as shown in the block diagram of FIG. 8 showing the principle of noise removal. It should be noted that "n" is an integer. The input signal I is input to the other non-inverted input terminal (+) of the operational amplifier OP20. Therefore, an output O of the operational amplifier OP20 is the sum of the input signal I and the 360-degree shifted signal. The noise removal circuit for the input signal I is thus configured.

Figure 9:
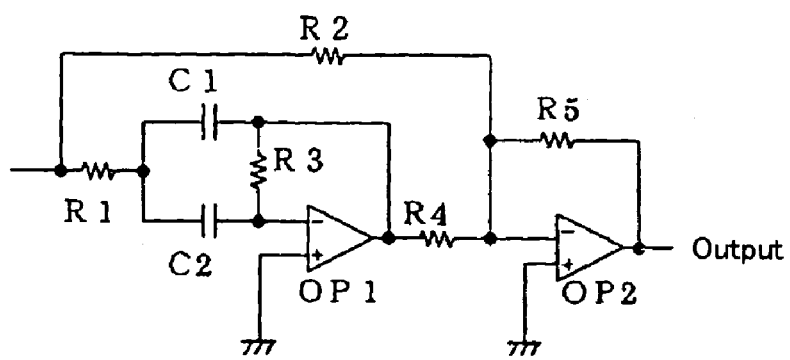
FIG. 9 is a circuit diagram of a noise removal circuit according to the second embodiment of the present invention.

FIG. 9 shows a specific circuit configuration of the phase shifting circuit shown in. FIG. 8. That is, a stage consisting of an operational amplifier OP2 and a resistor R5 is further provided in FIG. 9 in place of the buffer BUF1 in the circuit of FIG. 2 showing the first embodiment. Description of the commonalities between the circuits in FIGS. 9 and 2 is as given in the first embodiment. The difference from the circuit shown in FIG. 2 is that the output of the operational amplifier OP1 is input to the inverted input terminal (−) of the operational amplifier OP2 via the resistor R4. The non-inverted input terminal (+) of the operational amplifier OP2 is grounded. The output of the operational amplifier OP2 is fed back to the inverted input terminal (−) of OP2 via the resistor R5. The output of the operational amplifier OP2 is a signal phase-shifted by n*360 degrees from the signal component of the input signal I input to the resistor R2.

In this embodiment, a modification can be made using a DLL-based phase adjusting circuit or PLL-based phase comparing circuit by providing a phase comparator and VCO circuit as with the first embodiment in FIGS. 3 and 6.

The principle of noise removal from the input signal I will be described using mathematical formulas.

If we let the pure wobble signal be WO=A*sin(ωt) and the noise component be N(t), then the input signal I(t) can be expressed by I(t)=A*sin(ωt)+N(t). In the principle of noise removal of this embodiment, a sum is taken by adding the input signal I(t) and a signal phase-shifted from the input signal by n*360 degrees (n is an integer).

That is, the signal phase-shifted from the input signal by n*360 degrees (n is integer) or I(t−2nπ) is expressed by A*sin(ωt−2nπ)+N(t). Therefore, taking the sum of the input signal I(t) and the signal phase-shifted by n*360 degrees (n is an integer) from the signal component of the input signal, the resultant signal can be expressed by $$I(t)+I(t-2n\pi)=A*(\sin(\omega t)+\sin(\omega t-2n\pi))+\sqrt{(2*N(t)'2)}=2*A*\sin(\omega t)+\sqrt{2}*N(t).$$

That is, although the S/N ratio of the input signal I(t) is originally A/N(t), the S/N ratio after noise removal is $\sqrt{2}$*A/N(t), providing a $\sqrt{2}$ fold improvement in S/N ratio.

THIRD EMBODIMENT

Figure 10:
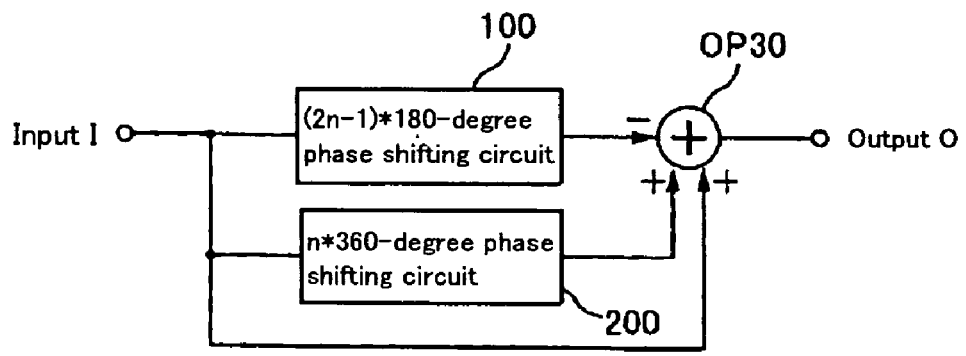
FIG. 10 is a block diagram showing the principle of noise removal according to a third embodiment of the present invention.

The third embodiment will be described with reference to FIG. 10. This embodiment is, as shown in FIG. 10 showing the principle of noise removal, the result of combination of the first embodiment shown in FIGS. 1 to 7 and the second embodiment shown in FIGS. 8 and 9. The combination produces a synergetic effect.

That is, the (2n−1)*180-degree phase shifting circuit 100 generates a signal phase-shifted by (2n−1)*180 degrees from the signal component of the input signal I (hereinafter referred to as "180-degree shifted signal") and outputs the signal to the inverted input terminal (−) of an operational amplifier (calculation output section) OP30. It should be noted that "n" is an integer.

Further, a signal phase-shifted from the signal component of the input signal I by n*360 degrees (hereinafter referred to as "360-degree shifted signal") is generated by the n*360-degree phase shifting circuit 200 and output to the non-inverted input terminal (+) of the operational amplifier OP30. It should be noted that "n" is an integer. The input signal I is input to the non-inverted input terminal (+) of the operational amplifier OP30.

Therefore, an output O of the operational amplifier OP30 is the result of addition of the 360-degree shifted signal and the input signal I and subtraction of the 180-degree shifted signal. The noise removal circuit for the input signal I is thus configured.

The operational amplifier OP30 is constituted by an operational amplifier having three known inputs. The operational amplifier OP30 may be constituted by two stages of two-input operational amplifiers That is, the operational amplifier OP30 is constituted by a first two-input operational amplifier equipped with a non-inverted input terminal (+) and an inverted input terminal (−) and a second two-input operational amplifier equipped with two non-inverted input terminals (+). That is, the output of the first two-input operational amplifier and the input signal I are the inputs to the second two-input operational amplifier The output of the second two-input operational amplifier is the output O of the operational amplifier OP30.

The principle of noise removal from the input signal I will be described using mathematical formulas. Taking the sum of the input signal and the signal phase-shifted from signal component of the input signal I by n*360 degrees and further taking the difference from the signal phase-shifted from the signal component of the input signal by (2n−1)*180 degrees (n is an integer), the resultant signal can be expressed by $$I(t)+I(t-2n\pi)-I(t-(2n-1)*\pi)=A*(\sin(\omega t)+\sin(\omega t-2n\pi)-\sin(\omega t-2n\pi)-\sin(\omega t-(2n-1)*\pi))+\sqrt{(3*N(t)'2)}=3*A*\sin(\omega t)+\sqrt{3}*N(t).$$

That is, although the S/N ratio of the input signal I(t) is originally A/N(t), the S/N ratio after noise removal is $\sqrt{3}*A/N(t)$, providing a $\sqrt{3}$ fold improvement in S/N ratio. The $\sqrt{3}$ fold improvement in S/N ratio in this embodiment surpasses the improvement achieved in the first and second embodiments.

<Use of Wobble Signal for Noise Removal>

Figure 11:
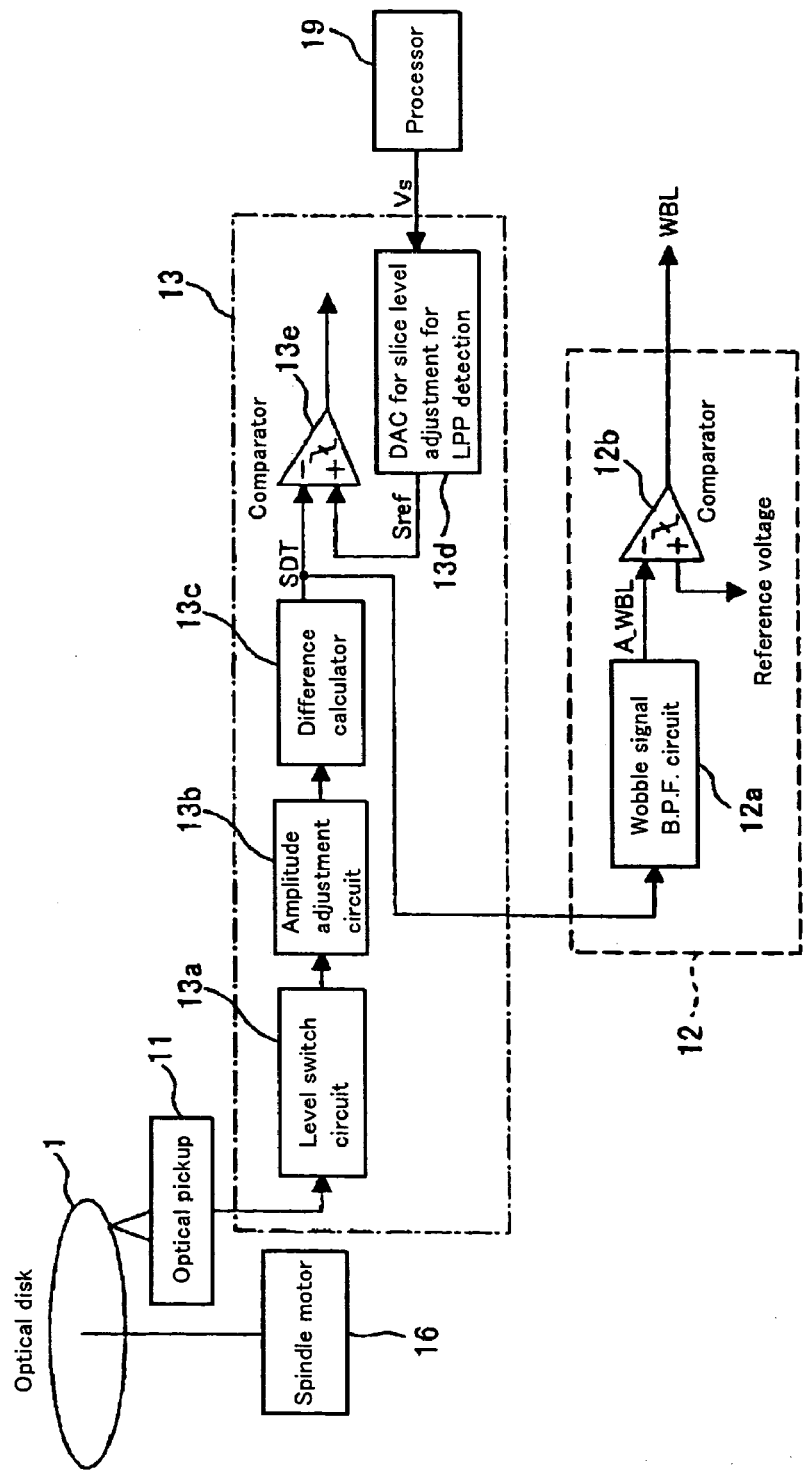
FIG. 11 is a functional block diagram focusing on a WBL detection unit 12 and an LPP detection unit 13 in an optical disk recording-reproduction device.

Wobble signal is used in the noise removal circuits of the first to third embodiments as an applied example of the present invention. That is, the input signal to the noise removal circuits of FIGS. 1 to 10 is a wobble signal for rotation control detected from optical disk's recording track. That is, the input signal to the noise removal circuit is the WBL signal component A_WBL output from the wobble signal B.P.F. circuit 12*a* in FIG. 11 described in the paragraph touching on the related art. The noise-free output signal from the noise removal circuit is input to the inverted input terminal (−) of the comparator 12*b*.

Therefore, reduction in noise component in the wobble signal prevents occurrence of jitter during optical disk recording and reproduction. As a result, problems derived from noise in the wobble signal can be resolved such as failure to achieve synchronization between optical disk rotation speed and clock, thus allowing proper recording and reproduction.

Even if the wobble signal is amplitude-modulated depending on the disk or pickup condition, phase-shifting of the signal as well as taking the sum and/or difference ensures averaging of the amplitude modulation, thus allowing correct reading of the wobble signal.

Further, even if the wobble signal is lost, phase-shifting of the signal as well as taking the sum or difference ensures interpolation of the lost wobble signal, thus avoiding adverse effect on the control system using the wobble signal.

Still further, even if an AC signal is superposed onto the wobble signal at disk rotation cycles, the noise removal circuit performs phase shifting by (2n−1)*180 degrees and takes the difference from the signal at the immediately previous moment, rejecting a DC offset and AC signal at disk rotation cycles and thereby allowing correct reading of the wobble signal.

While the present invention was described based on specific embodiments, the present invention is not limited thereto, but is capable of variation and modification without departing from the spirit and scope of the invention.

The S/N ratio of wobble and other signals can be improved.

What is claimed is:

1. A signal output circuit comprising:
   a 180-degree phase shifting circuit for shifting a phase of an input signal by an odd multiple of 180 degrees, wherein the 180-degree phase shifting circuit further comprises:
      a second operational amplifier having a non-inverted input terminal, an inverted input terminal, and an output terminal,
      first through fourth resistors, and
      a first capacitor and a second capacitor; and
   a first operational amplifier having first and second input terminals and an output terminal, the first and second input terminals having a different polarity,
   wherein the input signal is input into the first input terminal,
   wherein a 180-degree shifted signal output from the 180-degree phase shifting circuit is input to the second input terminal,
   wherein a difference between the input signal and the 180-degree shifted signal is output from the output terminal of the first operational amplifier,
   wherein the input signal is input to the inverted input terminal via the first resistor, the first capacitor, and the third resistor, and input to the inverted input terminal via the first resistor and the second capacitor, and
   wherein an output of the output terminal of the second operational amplifier is fed back to the inverted input terminal via the third resistor, and fed back to the inverted input terminal via the first capacitor and the second capacitor, and fed back to a signal input side of the first resistor via the fourth resistor and the second resistor.

2. The signal output circuit according to claim 1, wherein the input signal is a wobble signal for rotation control detected from a recording track of an optical disk.

3. A signal output circuit comprising:
   a 180-degree phase shifting circuit for shifting a phase of an input signal by an odd multiple of 180 degrees, wherein the 180-degree phase shifting circuit further comprises:
      a second operational amplifier having a non-inverted input terminal, an inverted input terminal, and an output terminal,
      first through fourth resistors, and
      first and second capacitors, the capacitances of the first and second capacitors capable of being changed in response to a synchronizing signal;
   a first operational amplifier having first and second input terminals and an output terminal, the first and second input terminals having a different polarity; and
   a phase comparator operable to:
      compare a phase of the input signal and a phase of the 180-degree shifted signal; and
      output the synchronizing signal for synchronizing the 180-degree shifted signal with the input signal, wherein the 180-degree phase shifting circuit is controlled in response to the synchronizing signal so as to output the 180-degree shifted signal while synchronizing the 180-degree shifted signal with the input signals,
   wherein the input signal is input into the first input terminal,
   wherein a 180-degree shifted signal output from the 180-degree phase shifting circuit is input to the second input terminal,
   wherein a difference between the input signal and the 180-degree shifted signal is output from the output terminal of the first operational amplifier,
   wherein the input signal is input to the inverted input terminal via the first resistor, the first capacitor, and the third resistor, and input to the inverted input terminal via the first resistor and the second capacitor, and wherein an output of the output terminal of the second operational amplifier is fed back to the inverted input terminal via the third resistor, fed back to the inverted input terminal via the first capacitor and the second capacitor, and fed back to a signal input side of the first resistor via the fourth resistor and the second resistor.

4. The signal output circuit according to claim 3, wherein the input signal is a wobble signal for rotation control detected from a recording track of an optical disk.

5. A signal output circuit comprising:
a 180-degree phase shifting circuit for shifting a phase of an input signal by an odd multiple of 180 degrees, wherein the 180-degree phase shifting circuit further comprises:
   a second operational amplifier having a non-inverted input terminal, an inverted input terminal, and an output terminal,
   first through fourth resistors, and
   first and second capacitors, the capacitances of the first and second capacitors capable of being changed in response to a synchronizing signal;
a first operational amplifier having first and second input terminals and an output terminal, the first and second input terminals having a different polarity;
a voltage controlled oscillator ("VCO") circuit; and
a phase comparator operable to:
   compare the input signal and an output of the VCO circuit; and
   output the synchronizing signal for synchronizing the 180-degree shifted signal with the input signal,
wherein the 180-degree phase shifting circuit and the VCO circuit are controlled in response to the synchronizing signal so as to output the 180-degree shifted signal while synchronizing the 180-degree shifted signal with the input signal,
wherein the input signal is input to the inverted input terminal via the first resistor, the first capacitor, and the third resistor, and input to the inverted input terminal via the first resistor and the second capacitor,
wherein an output of the output terminal of the second operational amplifier is fed back to the inverted input terminal via the third resistor, and fed back to the inverted input terminal via the first capacitor and the second capacitor, and fed back to a signal input side of the first resistor via the fourth resistor and the second resistor.
wherein the input signal is input into the first input terminal,
wherein a 180-degree shifted signal output from the 180-degree phase shifting circuit is input to the second input terminal, and
wherein a difference between the input signal and the 180-degree shifted signal is output from the output terminal of the first operational amplifier.

6. The signal output circuit according to claim 5, wherein the input signal is a wobble signal for rotation control detected from a recording track of an optical disk.

7. A signal output circuit comprising:
a 360-degree phase shifting circuit for shifting a phase of an input signal by an integral multiple of 360 degrees, wherein the 360-degree phase shifting circuit further comprises:
   a second operational amplifier having a non-inverted input terminal, an inverted input terminal, and an output terminal,
   a third operational amplifier having a non-inverted input terminal, an inverted input terminal, and an output terminal,
   first through fifth resistors, and
   first and second capacitors; and
a first operational amplifier having a first and second input terminals and an output terminal, the first and second input terminals having a same polarity,
wherein the input signal is input to the first input terminal,
wherein a 360-degree shifted signal output from the 360-degree phase shifting circuit is input to the second input terminal,
wherein a sum of the input signal and the 360-degree shifted signal is output from the output terminal of the first operational amplifier,
wherein the input signal is input to the inverted input terminal of the second operational amplifier via the first resistor, the first capacitor, and the third resistor, and input to the inverted input terminal of the second operational amplifier via the first resistor and the second capacitor,
wherein an output of the output terminal of the second operational amplifier is fed back to the inverted input terminal of the second operational amplifier via the third resistor, and fed back to the inverted input terminal of the second operational amplifier via the first capacitor and the second capacitor, and fed back to a signal input side of the first resistor via the fourth resistor and the second resistor, and input to the inverted input terminal of the third operational amplifier via the fourth resistor, and
wherein an output of the output terminal of the third operational amplifier is fed back to the inverted input terminal of the third operational amplifier via the fifth resistor.

8. The signal output circuit according to claim 7, wherein the input signal is a wobble signal for rotation control detected from a recording track of an optical disk.

9. A noise removal apparatus comprising:
an input terminal configured to receive an electrical input signal from an external source;
a phase-shifting circuit further comprising a phase-shift input terminal electrically connected to the input terminal, and a phase-shift output terminal, the phase-shifting circuit configured to:
   shift the phase of the electrical input signal by an odd multiple of 180-degrees to produce a phase-shifted signal, and
   output the phase-shifted signal via the phase-shift output terminal; and
a first operational amplifier further comprising a first terminal electrically connected to the input terminal, and a second terminal having an opposite polarity than the first terminal, the second terminal electrically connected to the phase-shift output terminal, the first operational amplifier configured to output a difference signal corresponding to a difference between the electrical input signal and the phase-shifted signal.

10. The noise removal apparatus of claim 9, wherein the phase-shifting circuit further comprises:
a first resistor further comprising an input side electrically connected to the phase-shift input terminal, and an output side;
a second resistor;
first and second capacitors electrically each connected to the output side of the first resistor and the second resistor;

a second operational amplifier further comprising an inverting terminal electrically connected to the second capacitor and the second resistor, a non-inverting terminal electrically connected to a reference potential, and an output terminal fed back to the inverting terminal via the second resistor;

a third resistor further comprising an input side electrically connected to the output terminal of the second operational amplifier, and an output side; and a fourth resistor further comprising an input side electrically connected to the output side of the third resistor, and an output side electrically connected to the input side of the first resistor.

11. The noise removal apparatus of claim 10, wherein the reference potential is ground.

12. The noise removal apparatus of claim 9, wherein the phase-shifting circuit is a frequency-controlled phase-shifting circuit.

13. The noise removal apparatus of claim 12, further comprising:
a phase comparator further comprising:
a first input terminal electrically connected to the phase-shift input terminal,
a second input terminal electrically connected to the phase-shift output terminal, and
an output terminal electrically connected to the frequency-controlled phase-shifting circuit, the phase comparator configured to output a frequency control signal via the output terminal.

14. The noise removal apparatus of claim 13 further comprising a third capacitor, the third capacitor further comprising a first side electrically connected to the output terminal of the phase comparator, and a second side, wherein the third capacitor is configured to remove high-frequency noise from the phase comparator.

15. The noise removal apparatus of claim 13, further comprising a voltage controlled oscillator ("VCO") circuit further comprising a first side electrically connected the output terminal of the phase comparator, and a second side electrically connected to second input terminal of the phase comparator.

16. The noise-removal apparatus of claim 13 wherein the frequency controlled phase-shifting circuit further comprises:
a first resistor further comprising an input side electrically connected to the phase-shift input terminal and an output side;
a second resistor;
first and second variable capacitors electrically each connected to the output side of the first resistor, and the second resistor;
a second operational amplifier further comprising an inverting terminal electrically connected to the second variable capacitor and the second resistor, a non-inverting terminal electrically connected to a reference potential, and an output terminal fed back to the inverting terminal via the second resistor;
a third resistor further comprising an input side electrically connected to the output terminal of the second operational amplifier, and an output side; and
a fourth resistor further comprising an input side electrically connected to the output side of the third resistor, and an output side electrically connected to the input side of the first resistor.

17. The noise removal apparatus of claim 16, wherein the reference potential is ground.

18. The noise removal apparatus of claim 16, wherein the first and second variable capacitors have capacitances which are each adjusted by the frequency control signal.

19. The noise removal apparatus of claim 9, wherein the electrical input signal is a wobble signal for rotation control detected from a recording track of an optical disk.

20. A noise removal apparatus comprising:
an input terminal configured to receive an electrical input signal from an external source;
a phase-shifting circuit further comprising a first terminal electrically connected to the input terminal, and a second terminal, the phase-shifting circuit configured to:
shift the phase of the electrical input signal by a multiple of 360-degrees to produce a phase-shifted signal, and
output the phase-shifted signal via a second terminal; and
a first operational amplifier further comprising a first non-inverting terminal electrically connected to the input terminal, and a second non-inverting terminal electrically connected to the second terminal, the first operational amplifier configured to output a summation signal corresponding to a summation of the electrical input signal and the phase-shifted signal.

21. The noise removal apparatus of claim 20, wherein the phase-shifting circuit comprises:
a first resistor further comprising an input side electrically connected to the first terminal, and an output side;
a second resistor;
first and second capacitors electrically each connected to the output side of the first resistor and the second resistor;
a second operational amplifier further comprising an inverting terminal electrically connected to the second capacitor and the second resistor, a non-inverting terminal electrically connected to a reference potential, and an output terminal fed back to the inverting terminal via the second resistor;
a third resistor further comprising an input side electrically connected to the output terminal of the second operational amplifier, and an output side;
a fourth resistor further comprising an input side electrically connected to the output side of the third resistor, and an output side electrically connected to the input side of the first resistor;
a third operational amplifier further comprising an inverting terminal electrically connected to the output side of the third resistor, a non-inverting terminal electrically connected to the reference potential, and an output terminal; and
a fifth resistor further comprising a first side electrically connected to the output terminal of the third operational amplifier, and an second side electrical connected to the output side of the third resistor.

22. The noise removal apparatus of claim 21, wherein the reference potential is ground.

23. A noise removal apparatus comprising:
an input terminal configured to receive an electrical input signal from an external source;
a first phase-shifting circuit further comprising a first phase-shift input terminal electrically connected to the input terminal, and a first phase-shift output terminal, the first phase-shifting circuit configured to:
shift the phase of the electrical input signal by an odd multiple of 180-degrees to produce a first phase-shifted signal, and output the first phase-shifted signal via the first phase-shift output terminal;
a second phase-shifting circuit further comprising a second phase-shift input terminal electrically connected to the input terminal, and a second phase-shift output terminal, the second phase-shifting circuit configured to:
shift the phase of the electrical input signal by a multiple of 360-degrees to produce a second phase-shifted signal, and
output the second phase-shifted signal via a second phase-shift output terminal; and
an operational amplifier further comprising an inverting terminal electrically connected to the first phase-shift output terminal, a first non-inverting terminal electrically connected to the second phase-shift output terminal, and a second non-inverting terminal electrically connected to the input terminal, the operational amplifier configured to output an output signal corresponding to a summation of the electrical input signal and the second phase-shifted signal minus the first phase-shifted signal.

24. The noise removal apparatus of claim 23, wherein the operational amplifier further comprises:
a first two-input operational amplifier further comprising an inverting terminal electrically connected to the first phase-shift output terminal, a non-inverting terminal electrically connected to the second phase-shift output terminal, and an output terminal; and
a second two-input operational amplifier further comprising a first non-inverting terminal electrically connected to the output terminal of the first two-input operational amplifier, a second non-inverting input electrically connected to the input terminal, the second two-input operational amplifier configured to output the output signal.

25. A noise removal method comprising:
receiving, at an input terminal, an electrical input signal from an external source;
receiving, at a phase-shifting circuit, the electrical input signal, the phase-shifting circuit further comprising a phase-shift input terminal electrically connected to the input terminal, and a phase-shift output terminal;
shifting, at the phase-shifting circuit, the phase of the electrical input signal by an odd multiple of 180-degrees to produce a phase-shifted signal;
outputting, via the phase-shift output terminal, the phase-shifted signal;
receiving, at an operational amplifier, the phase-shifted signal, the operational amplifier further comprising a first terminal electrically connected to the input terminal, a second terminal having an opposite polarity than the first terminal, the second terminal electrically connected to the phase-shift output terminal, and an output terminal; and
outputting, via the output terminal of the operational amplifier, a difference signal corresponding to a difference between the electrical input signal and the phase-shifted signal.

26. A noise removal method comprising:
receiving, at an input terminal, an electrical input signal from an external source;
receiving, at a phase-shifting circuit, the electrical input signal, the phase-shifting circuit further comprising a first terminal electrically connected to the input terminal, and a second terminal;
shifting, at the phase-shifting circuit, the phase of the electrical input signal by a multiple of 360-degrees to produce a phase-shifted signal;
outputting, via the second terminal of the phase-shifting circuit, the phase-shifted signal via the second terminal;
receiving, at an operational amplifier, the phase-shifted signal, the operational amplifier further comprising a first non-inverting terminal electrically connected to the input terminal, a second non-inverting terminal electrically connected to the second terminal, and an output terminal; and
outputting, via the output terminal of the operational amplifier, a summation signal corresponding to a summation of the electrical input signal and the phase-shifted signal.

27. A noise removal method comprising:
receiving, at an input terminal, an electrical input signal from an external source;
receiving, at a first phase-shifting circuit, the electrical input signal, the first phase-shifting circuit further comprising a first phase-shift input terminal electrically connected to the input terminal, and a first phase-shift output terminal;
receiving, at a second phase-shift input circuit, the electrical input signal, the second phase-shifting circuit further comprising a second phase-shift input terminal electrically connected to the input terminal, and a second phase-shift output terminal;
shifting, at the first phase-shifting circuit, the phase of the electrical input signal by an odd multiple of 180-degrees to produce a first phase-shifted signal;
shifting, at the second phase-shifting circuit, the phase of the electrical input signal by a multiple of 360-degrees to produce a second phase-shifted signal;
outputting, via the first phase-shift output terminal, the first phase-shifted signal;
outputting, via the second phase-shift output terminal, the second phase-shifted signal;
receiving the first phase-shifted signal at an inverting terminal of an operational amplifier;
receiving the second phase-shifted signal at a first non-inverting terminal of the operational amplifier;
receiving the electrical input signal at a second non-inverting terminal of the operational amplifier; and
outputting an output signal corresponding to a summation of the electrical input signal and the second phase-shifted signal minus the first phase-shifted signal.

* * * * *